US00RE46472E

(19) United States
(12) Reissued Patent
Hashimoto

(10) Patent Number: US RE46,472 E
(45) Date of Reissued Patent: *Jul. 11, 2017

(54) SLOT-TYPE GAMING MACHINE WITH IMPROVED CABINET

(71) Applicant: UNIVERSAL ENTERTAINMENT CORPORATION, Koto-ku, Tokyo (JP)

(72) Inventor: Koichiro Hashimoto, Tokyo (JP)

(73) Assignee: Universal Entertainment Corporation, Tokyo (JP)

( * ) Notice: This patent is subject to a terminal disclaimer.

(21) Appl. No.: 14/961,361

(22) Filed: Dec. 7, 2015

Related U.S. Patent Documents

Reissue of:
(64) Patent No.: 8,641,534
Issued: Feb. 4, 2014
Appl. No.: 12/129,013
Filed: May 29, 2008

(30) Foreign Application Priority Data

Jun. 18, 2007 (JP) ..... 2007-160632

(51) Int. Cl.
*A47B 21/04* (2006.01)
*A63F 13/00* (2014.01)
*A47B 81/00* (2006.01)
*G07F 17/32* (2006.01)

(52) U.S. Cl.
CPC ..... *G07F 17/32* (2013.01); *G07F 17/3216* (2013.01)

(58) Field of Classification Search
CPC ..... G07F 17/326; G07F 17/32
USPC ..... 463/46; 312/198, 199, 223.1, 223.2, 312/223.3
See application file for complete search history.

(56) References Cited

U.S. PATENT DOCUMENTS

| | | | | |
|---|---|---|---|---|
| 4,084,194 | A * | 4/1978 | Hector | 463/34 |
| 5,386,903 | A * | 2/1995 | Rothschild et al. | 194/350 |
| 5,456,468 | A * | 10/1995 | Stringfellow et al. | 463/46 |
| 5,544,595 | A | 8/1996 | Stephenson, III et al. | |
| 5,660,360 | A * | 8/1997 | Yang | 248/118 |
| 6,290,229 | B1 * | 9/2001 | Perez | 273/148 R |

(Continued)

FOREIGN PATENT DOCUMENTS

| | | |
|---|---|---|
| CH | 683886 | 6/1994 |
| EP | 1117079 | 7/2001 |

(Continued)

OTHER PUBLICATIONS

Extended European Search Report, App No. EP2012284, Nov. 17, 2009.

(Continued)

*Primary Examiner* — Joseph Kaufman
(74) *Attorney, Agent, or Firm* — KMF Patent Services, PLLC; S. Peter Konzel; Kenneth M. Fagin

(57) ABSTRACT

A gaming machine is provided, which includes a cabinet having a front opening, a front door, a display device, an input device and a controller. The front door is pivotably coupled to the cabinet via a hinge that is attached to a lateral end portion at a front face of the cabinet, and opens and closes the front opening. The display device is placed in the front face of the cabinet. The input device allows a player to perform operation related to the game. The front door has an operation table that projects forward from the cabinet. The input device is placed on the operation table. A cutout is arranged such that a side portion of the operation table closer to the hinge has a recess.

21 Claims, 6 Drawing Sheets

(56) References Cited

U.S. PATENT DOCUMENTS

| | | | | |
|---|---|---|---|---|
| 6,334,612 | B1 | 1/2002 | Wurz et al. | |
| 6,422,670 | B1 * | 7/2002 | Hedrick et al. | 312/223.1 |
| 6,446,920 | B1 * | 9/2002 | Wells et al. | 248/118 |
| 6,578,847 | B1 * | 6/2003 | Hedrick et al. | 273/138.2 |
| 6,702,409 | B2 * | 3/2004 | Hedrick et al. | 312/223.1 |
| 6,779,794 | B2 * | 8/2004 | Hedrick et al. | 273/148 R |
| 6,860,814 | B2 * | 3/2005 | Cole | 463/46 |
| 6,886,896 | B2 * | 5/2005 | Hedrick et al. | 312/223.1 |
| 6,913,331 | B1 * | 7/2005 | Luciano et al. | 312/223.1 |
| 6,958,015 | B2 * | 10/2005 | Luciano et al. | 463/46 |
| 6,997,810 | B2 * | 2/2006 | Cole | 463/46 |
| 7,066,816 | B2 * | 6/2006 | Gauselmann | 463/29 |
| 7,374,258 | B2 * | 5/2008 | Bowron | 312/7.2 |
| D573,200 | S * | 7/2008 | Hashimoto et al. | D21/370 |
| 7,673,879 | B2 * | 3/2010 | Collings | 273/148 R |
| 7,846,026 | B2 * | 12/2010 | Stephenson et al. | 463/46 |
| 7,867,095 | B2 * | 1/2011 | Mattice et al. | 463/46 |
| 7,900,922 | B1 * | 3/2011 | Mallory | 273/138.1 |
| 7,955,176 | B2 * | 6/2011 | Tastad et al. | 463/46 |
| 8,016,683 | B2 * | 9/2011 | Cole | 463/46 |
| 8,088,013 | B2 * | 1/2012 | Abe et al. | 463/46 |
| 8,216,074 | B2 * | 7/2012 | Sakuma | 463/46 |
| 2002/0041133 | A1 * | 4/2002 | Hedrick et al. | 312/223.1 |
| 2003/0157978 | A1 * | 8/2003 | Englman | 463/16 |
| 2003/0176220 | A1 * | 9/2003 | Baerlocher | 463/26 |
| 2003/0199299 | A1 * | 10/2003 | Baerlocher | 463/16 |
| 2004/0018877 | A1 * | 1/2004 | Tastad et al. | 463/46 |
| 2004/0053699 | A1 * | 3/2004 | Rasmussen et al. | 463/46 |
| 2004/0090151 | A1 * | 5/2004 | Nagano | 312/223.1 |
| 2004/0132528 | A1 * | 7/2004 | Gauselmann | 463/29 |
| 2004/0160148 | A1 * | 8/2004 | Hedrick et al. | 312/223.1 |
| 2004/0171426 | A1 * | 9/2004 | Nagano | 463/46 |
| 2004/0224776 | A1 * | 11/2004 | Nagano | 463/46 |
| 2005/0020364 | A1 * | 1/2005 | Luciano et al. | 463/46 |
| 2005/0026702 | A1 * | 2/2005 | Cole | 463/46 |
| 2005/0181879 | A1 * | 8/2005 | Rothschild | 463/46 |
| 2005/0277477 | A1 * | 12/2005 | Hajder et al. | 463/46 |
| 2006/0030412 | A1 * | 2/2006 | Cole | 463/46 |
| 2006/0073900 | A1 * | 4/2006 | Cole | 463/46 |
| 2006/0172805 | A1 * | 8/2006 | Okada | 463/46 |
| 2006/0281559 | A1 * | 12/2006 | Luciano | 463/46 |
| 2007/0225079 | A1 * | 9/2007 | Cole | 463/46 |
| 2008/0113707 | A1 * | 5/2008 | Nesemeier et al. | 463/16 |
| 2008/0113708 | A1 * | 5/2008 | Beadell et al. | 463/16 |
| 2008/0261674 | A9 * | 10/2008 | Okada | 463/16 |
| 2008/0311976 | A1 * | 12/2008 | Hashimoto | 463/20 |
| 2008/0311987 | A1 * | 12/2008 | Hirato | 463/35 |
| 2009/0005178 | A1 * | 1/2009 | Abe et al. | 463/46 |
| 2009/0057504 | A1 * | 3/2009 | Borissov | 248/184.1 |
| 2009/0124395 | A1 * | 5/2009 | O'Keene et al. | 463/46 |
| 2010/0099502 | A1 * | 4/2010 | Cole | 463/46 |
| 2010/0120530 | A1 * | 5/2010 | Lesley et al. | 463/30 |
| 2010/0120539 | A1 * | 5/2010 | Endo et al. | 463/46 |
| 2010/0120540 | A1 * | 5/2010 | Hirato | 463/46 |
| 2010/0124962 | A1 * | 5/2010 | Chudek et al. | 463/13 |
| 2010/0173704 | A1 * | 7/2010 | Cole | 463/30 |
| 2011/0269552 | A1 * | 11/2011 | Haga et al. | 463/46 |
| 2013/0130809 | A1 * | 5/2013 | Bruzzese et al. | 463/46 |

FOREIGN PATENT DOCUMENTS

| | | |
|---|---|---|
| EP | 1437697 | 7/2004 |
| JP | H06-277124 | 4/1994 |
| JP | 102162 | 6/1998 |
| JP | H10-002162 | 6/1998 |
| JP | H10-179433 | 7/1998 |

OTHER PUBLICATIONS

Extended European Search Report from corresponding application, dated Nov. 25, 2009.

* cited by examiner

SLOT-TYPE GAMING MACHINE WITH IMPROVED CABINET

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is based on and claims the benefit of priority from Japanese Patent Application No. 2007-160632, filed on 18 Jun. 2007, the content of which is incorporated herein by reference.

BACKGROUND OF THE INVENTION

1. Field of the Invention

The present invention relates to a gaming machine such as a slot machine, in which a gaming medium (a gaming value) such as a coin is used to play a game and a gaming value such as credit is provided to a player.

2. Related Art

Generally, a slot machine has a reel unit inside an upper portion of a cabinet, which performs a variable display of a plurality of symbols. On the other hand, inside a lower portion of the cabinet, a hopper that stores and discharges medals as gaming media and a power box are placed. An operation table that allows a player to operate the slot machine is attached to the front door.

Among such slot machines, a slot machine is disclosed, which has an opening in the front face of a cabinet, and a front door. The front door can open and close the opening such that an inspection of various units inside the cabinet such as a reel unit and easy and smooth filling of medals are performed (for example, refer to U.S. Pat. No. 6,334,612, hereinafter referred to as Patent Document 1).

However, when the slot machine disclosed in Patent Document 1 is installed in a hall where slot machines are juxtaposed, the slot machine is required to be installed with enough spacing with respect to an adjacent slot machine. The reason for this is that an operation table provided on the front door collides against the other operation table of the adjacent slot machine when the front door is opened for maintenance of the slot machine.

SUMMARY OF THE INVENTION

The present invention has been made in view of the above-mentioned problems, and provides a novel gaming machine.

To solve the abovementioned problems, the present invention provides the following.

In an aspect of the present invention, a gaming machine is provided, which includes a cabinet having a front opening, a front door, a display device, an input device and a controller. The front door is pivotably coupled to the cabinet via a hinge that is attached to a lateral end portion at a front face of the cabinet, and opens and closes the front opening. The display device is placed in the front face of the cabinet and displays information related to a game. The input device allows a player to perform operation related to the game. The controller performs processing related to execution of the game in response to an input to the input device. The front door has an operation table that projects forward from the cabinet. The input device is placed at the operation table. A cutout is arranged such that a side portion of the operation table closer to the hinge has a recess.

The gaming machine described above that can allow the operation table to avoid collision with an operation table of an adjacent gaming machine while the front door is in an open position. In this way, the gaming machine allows the front door to be opened enough to perform an easy maintenance inside the cabinet. In addition, since it is possible to save spacing between juxtaposed gaming machines, the number of gaming machines installed in a given area available for installation can be increased. Since the cutout is arranged to be on the closer side with respect to the hinge, the cutout comes close to an operation table of an adjacent gaming machine when the front door is in an open position. The gaming machine allows the operation table to be spaced a certain distance from the operation table of the adjacent gaming machine so as to avoid collision. In this way, the gaming machine allows the front door to be opened enough to perform easy maintenance inside the cabinet.

In another aspect of the present invention, a gaming machine is provided, in which the cutout is configured such that the operation table becomes hollow toward the cabinet.

The gaming machine, which has the cutout configured as described above, allows the operation table to avoid collision with an operation table of an adjacent gaming machine even if the cutout comes close to the operation table of the adjacent gaming machine. In this way, the gaming machine allows the front door to be opened enough to perform easy maintenance inside the cabinet. In addition, the gaming machine allows spacing relative to an adjacent gaming machine to be saved, thereby increasing the number of gaming machines to be installed in a given area available for installation.

In still another aspect of the present invention, a gaming machine is provided, which includes a cabinet having a front opening, a front door, a display device, a bet button, a start button, an input device, a controller. The front door is pivotably coupled to the cabinet via a hinge that is attached to a lateral end portion at a front face of the cabinet. The front door opens and closes the front opening. The display device is placed in the front face of the cabinet and displays information related to a game. The bet button allows a player to bet an arbitrary amount of bets. The start button allows a game to start in response to betting through the bet button. The input device has at least the bet button and the start button. The controller performs processing related to execution of the game in response to an input to the input device. The front door has an operation table that projects forward from the cabinet. The input device is placed at the operation table. A cutout is arranged such that a first side portion of the operation table closer to the hinge has a recess. A rest portion for allowing a player to rest a wrist is provided at a second side portion opposite to the first side portion. The start button is arranged so as to be on a closer side with respect to the rest portion on the operation table.

The gaming machine described above, which has the frequently used start button on the closer side with respect to the rest portion, allows the player to continue the game for a longer period of time by alleviating fatigue of the player.

According to the present invention, it is possible to open the front door enough to perform easy maintenance inside the cabinet. Also, it is possible to save spacing between adjacent gaming machines so as to increase the number of gaming machines installed in a given area.

DETAILED DESCRIPTION OF THE INVENTION

Figure 1:
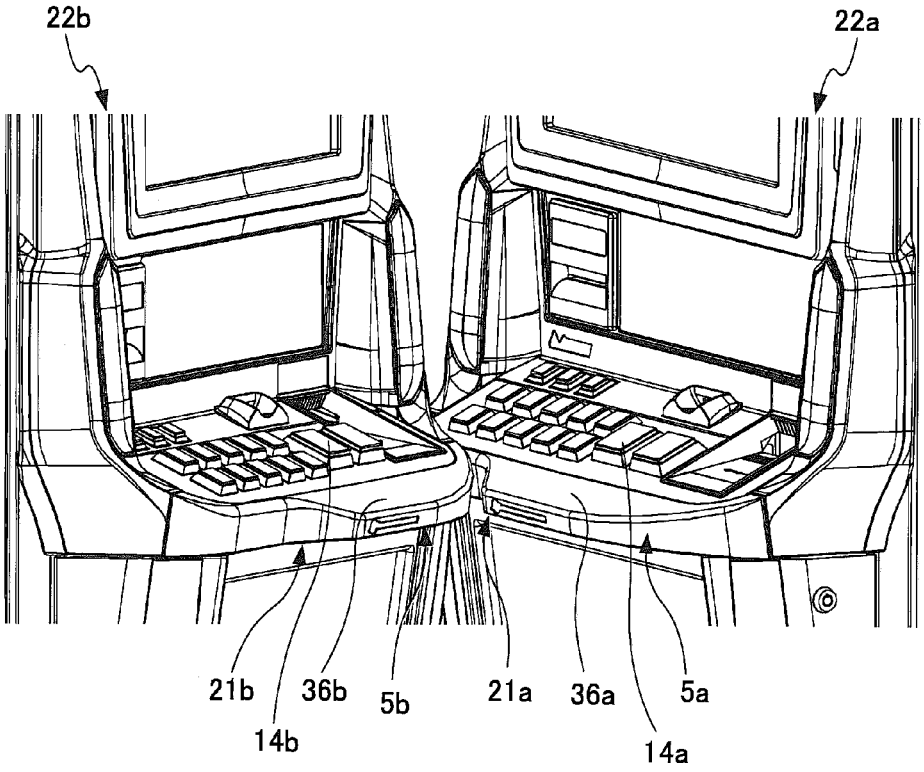
FIG. 1 is an enlarged view illustrating juxtaposed gaming machines with a front door of one gaming machine in an open position.

In the present embodiment, a gaming machine 1 has: a cabinet 2 having an opening 29 provided in a front face thereof; a front door 22 pivotally coupled to the cabinet 2 by way of a hinge 30 provided at a left side end of the front face of the cabinet 2, used for opening and closing the opening 29; a display disposed in a front face of the cabinet 2, which displays information related to a game (a main display 4 described later); an input device for carrying out operations related to the game (a 1-bet button 11, a 3-bet button 12, a 5-bet button 13 and a spin button 14 described later); and a controller that performs operations to execute a game in response to an input to the input device. The front door 22 projecting forward from the cabinet 2 has an operation table 5 on which the input device is provided. A cutout 21 is arranged to lie on a closer side of the front periphery of the operation table 5 with respect to the hinge 30. When a plurality of gaming machines 1 is juxtaposed and a front door 22 is opened, an operation table 5a of a first gaming machine 1a does not collide with an operation table 5b of a second gaming machine 1b which is adjacent to the first gaming machine 1a. Accordingly, the gaming machine 1 allows the front door 22 to be opened enough for an easy maintenance inside the cabinet. Furthermore, this can make spacing between the adjacent gaming machines smaller, and increase the number of gaming machines 1 which can be installed in a given installation area.

The gaming machine 1 according to the present embodiment is described hereinafter with reference to FIGS. 1 to 6. First, a schematic configuration of the gaming machine 1 of the present embodiment is described with reference to FIG. 1.

Outline of Gaming Machine 1

Figure 2:
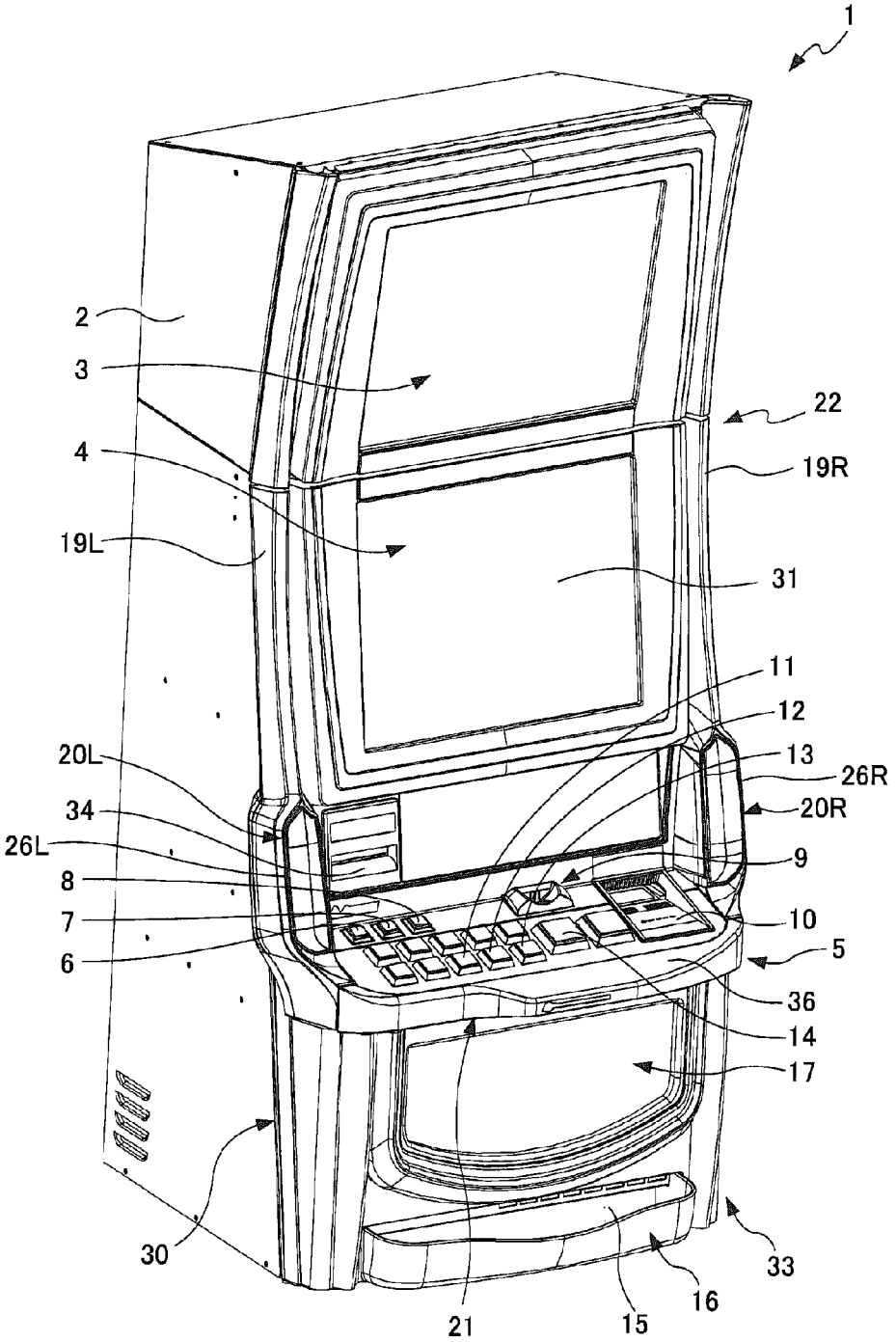
FIG. 2 is a perspective view illustrating a gaming machine according to the present invention.
Figure 3:
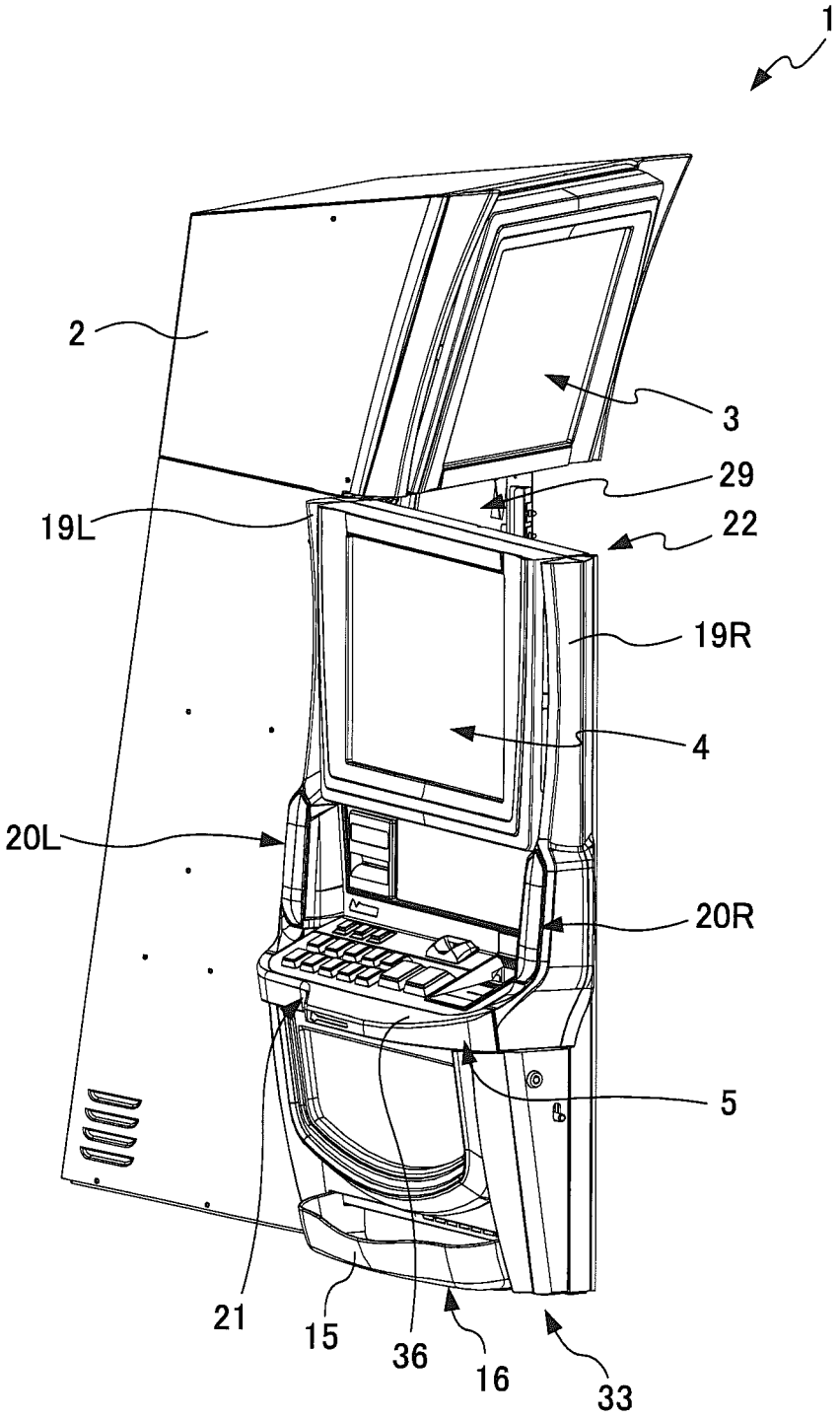
FIG. 3 is a perspective view illustrating a front door of the gaming machine in an open position.

FIG. 2 is a perspective view of the gaming machine 1. FIG. 3 is a perspective view illustrating a front door 22 of the gaming machine 1 in an open position. In FIGS. 2 and 3, the gaming machine 1 is an upright slot machine to be installed in game halls such as a casino, having a cabinet 2 for storing electronic and mechanical components for performing a game. The cabinet 2 is formed in a rectangular parallelepiped having an opening 29 in a front face thereof. The front door 22 that closes the opening 29 is pivotally attached to the cabinet 2 by way of a hinge 30 provided on a left side end portion of the front face of the cabinet 2. A sub display 3 is disposed in an upper portion of the front face of the cabinet 2, and a main display 4 is disposed in a central portion of the front face of the cabinet 2.

The sub display 3 constituted of a liquid crystal display displays an award table, which shows odds and the like indicating an award per single medal provided for a player winning the game, while the gaming machine 1 is in a base game or a standby state. The sub display 3 is tilted forward with respect to the gaming machine 1 so as to be more visually beneficial to the player, whose line of sight lies substantially at a height of the main display 4. A detailed configuration of the main display 4 is described later.

An operation table 5, which projects forward from the front face of the cabinet 2, is disposed below the main display 4. On the operation table 5, a CHANGE button 6, a CASH OUT button 7, and a HELP button 8 are disposed from the left. A coin slot 9 and a bill slot 10 are disposed on the right side of the HELP button B. In addition, in a front portion of the operation table 5, a 1-bet button 11, a 3-bet button 12, and a 5-bet button 13 are disposed from the left. In a right portion of the operation table 5, a SPIN/REPEAT-bet button (hereinafter referred to as a "spin button") 14 is disposed.

Here, the CHANGE button 6 is pressed by a player to change a bill inserted into the bill slot 10. The changed coins are discharged through a coin payout opening 15 to a coin tray 16 provided in a lower portion of the cabinet 2. A CHANGE switch is connected to the CHANGE button 6. When the CHANGE button 6 is pressed by a player, the CHANGE switch outputs a switch signal to a CPU device and the like, which control the gaming machine 1.

The CASH OUT button 7 is pressed by a player at the end of a base game to cash out coins obtained in the game to the coin tray 16 through the coin payout opening 15. A CASH OUT switch is connected to the CASH OUT button 7. When the CASH OUT button 7 is pressed by a player, the CASH OUT switch outputs a switch signal to a CPU device and the like, which control the gaming machine 1.

The HELP button 8 is pressed by a player when she is unfamiliar with how to play the game. When the HELP button 8 is pressed, the sub display 3 and the main display 4 display various kinds of help information. A HELP switch is connected to the HELP button 8. When the HELP button 8 is pressed, the HELP switch outputs a switch signal to a CPU device and the like, which control the gaming machine 1.

In addition, when an award table is not displayed on the sub display 3 during a game, the award table appears on the sub display 3 in response to the HELP button 8 pressed by a player.

A coin sensor is disposed at the coin slot 9. When a coin is inserted into the coin slot 9, the coin sensor outputs a coin detection signal to a CPU device and the like, which control the gaming machine 1. A bill sensor is disposed at the bill slot 10. When a bill is inserted into the bill slot 10, the bill sensor outputs a bill detection signal to a CPU device and the like, which control the gaming machine 1.

The 1-bet button 11 is used to bet a coin one by one and can be pressed to bet up to three times. A 1-bet switch is connected to the 1-bet button 11. When the 1-bet button 11 is pressed, the 1-bet switch outputs a switch signal to a CPU device and the like, which control the gaming machine 1.

The 3-bet button 12 is pressed to start a game with 3 coins bet. A 3-bet switch is connected to the 3-bet button 12. When the 3-bet button 12 is pressed, the 3-bet switch outputs a switch signal to a CPU device and the like, which control the gaming machine 1. The 5-bet button 13 is pressed to start a game with 5 coins bet or to start a bonus game which provides a special gaming mode which is advantageous to the player. A 5-bet switch is connected to the 5-bet button 13.

When the 5-bet button 13 is pressed, the 5-bet switch outputs a switch signal to a CPU device and the like, which control the gaming machine 1.

The spin button 14 is used as a game start button to start a game on condition that a bet has been made by way of the bet button 11, 12 or 13. The spin button 14 is pressed by a player to start rotation of reels (described later) so as to execute a game with the present bet amount or the previous bet amount. The spin button 14, which must be pressed at the beginning of each game, is a frequently used button. Accordingly, the spin button 14 is preferably provided on the right hand side of the operation table 5 of a gaming machine 1 designed for right-handed players. On the contrary, the spin button 14 is preferably provided on the left hand side a gaming machine 1 designed for left-handed players. A spin switch is connected to the spin button 14. When the spin button 14 is pressed, the spin switch outputs a switch signal to a CPU device and the like, which control the gaming machine 1. In addition, bet amounts allowed for a player to wager by pressing the spin button 14 are 1, 2, 3, and 5.

In a lower portion of the cabinet 2, the coin payout opening 15 is formed and the coin tray 16 is provided, which receives coins discharged through the coin payout opening 15. A coin detector is provided inside the coin payout opening 15 for detecting the number of coins discharged through the coin payout opening 15.

Reels and Main Display

Subsequently, a description is given of a detailed configuration of the main display 4 and five reels (not shown) rotatably provided behind the main display 4 in the cabinet 2.

The main display 4 is a panel that provides a display of rotation of symbols to which a player pays continuous attention. The main display 4 has a transparent touch panel 31 disposed on the front face thereof and a transparent liquid crystal display, which is translucent and fixed to the front door 22 of the cabinet 2. Five transparent display windows (not shown) are provided on the main display 4. Behind the main display 4, five mechanical reels are disposed in parallel, and supported independently and rotatably. Each of the five reels is disposed so as to face each of the display windows formed on the main display 4.

A plurality of kinds of symbols is arranged on an outer peripheral surface of each reel. Three symbols are externally visible through each of the display windows for each of the five mechanical reels disposed inside the cabinet 2. A plurality of pay lines (not shown) that traverses the five display windows horizontally and obliquely is also displayed on the main display 4. The main display 4 is tilted back to allow a player, whose line of sight lies substantially at a height of the main display 4, to turn her eyes slightly downward at the main display 4 so as to allow her to have a comfortable posture. Although the mechanical reels disposed behind the main display 4 to variably display the symbols have been described above, video reels can alternatively be displayed on the main display 4. In addition, the number of reels is not limited to 5.

A winning combination is predetermined based on a combination of plurality of kinds of symbols. When a combination matching a winning combination of symbols is statically displayed along a pay line, coins are discharged through the coin payout opening 15 in accordance with the winning combination. Nine symbols printed on a long slip of sticker, which has a compatible width and circumferential length of a reel, is typically attached to the circumferential surface of the reel. However, it is apparent that the symbols may alternatively be provided in other ways.

In the present embodiment, only a center line is set as a pay line. The pay line is displayed on the main display 4 when a player plays a game by rotating and stopping the reels by pressing the 1-bet button 11, the 3-bet button 12, or 5-bet button 13, and then pressing the spin button 14. On the contrary, when a player plays various bonus games obtained, which provide special gaming modes advantageous to the player, by pressing the 5-bet button 13, the pay line disappears from the main display 4.

A ticket printer 34 is installed on the left, below the main display 4, which outputs tickets with information in accordance with the displayed result on the main display 4.

The operation table 5 projecting from the front face of the cabinet 2 is disposed below the ticket printer 34. In addition, a lower panel 17 is disposed below the operation table 5, which is a plastic panel having a printed image related to the game. The lower panel 17 is illuminated by way of a cold-cathode tube. Furthermore, below the lower panel 17, the coin tray 16 is provided for accumulating coins paid out according to a result of the game.

Front Door

As shown in FIGS. 2 and 3, the gaming machine 1 has the front door 22 with the main display 4 and the operation table 5, and a lower front door 33 with the lower panel 17 and the coin tray 16. The front door 22 and the lower front door 33 are configured to swing open so as to implement better workability in opening and closing these doors 22 and 33. The front door 22 is provided at the front of the cabinet 2 and is supported on the left end portion of the cabinet 2 by the hinge 30. Since the front door 22 is attached to the left end portion of the cabinet 2 via the hinge 30 and the front face of the cabinet 2 is tilted back, the front door 22 can be opened not less than 90 degrees while lifting up the right portion of the front door 22.

As shown in FIG. 3, the lower front door 33 swings open along with the front door 22. Accordingly, a large opening 29 appears at the front of the cabinet 2. While the front door 22 is open, the reels and wiring disposed inside the cabinet 2 can undergo maintenance, and a collection box (not shown) in the cabinet 2 can be exposed. The collection box is used for collecting bills inserted through the bill slot 10. In addition, a coin hopper (not shown) is also installed in the opening 29, which accumulates the coins inserted from the coin slot 9. The coin tray 16 receives the coins that are discharged by the coin hopper as necessary.

The coin tray 16 is fixed at the bottom end of the front face of the lower front door 33 that is mainly used for collecting bills and the like. The coin tray 16 extends across substantially the entire width of the lower front door 33 and accumulates the coins discharged from the coin hopper installed inside the cabinet 2. When an internal maintenance operation of the gaming machine 1 is required or collection of bills from the collection box in the gaming machine 1 is required for a case where the accumulated coins reach above the upper rim of the coin tray 16, the front door 22 and the lower front door 33 in an open position do not interfere with the operation carried out inside the cabinet 2, thereby improving the efficiency of operation. As shown in FIGS. 2 and 3, this is implemented by the fact that the coin tray 16 moves to a position to avoid contact with an operator while the front door 22 and the lower front door 33 are in an open position. The coin tray 16 is used not only to accumulate the gaming medium discharged from the gaming machine 1 such as medals, tokens, tickets and the like, but also to hold belongings of the player (for example, cigarettes and a hand bag).

Operation Table

Figure 6:
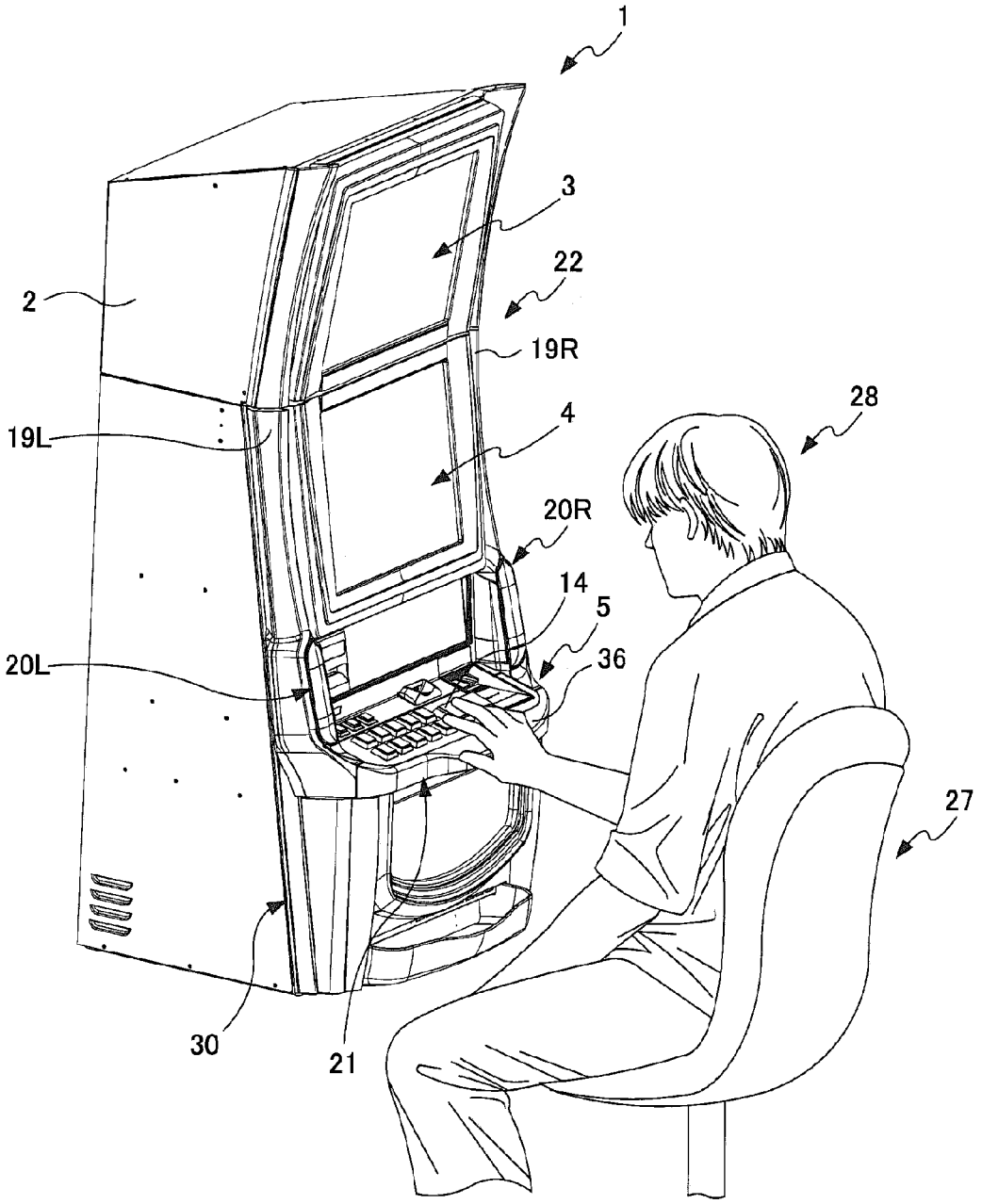
FIG. 6 is a diagram illustrating a player playing a game.

As shown in FIGS. 2 and 6, the operation table 5 is disposed in front of the cabinet 2 and below the main display 4. The operation table 5 laterally extends along the width direction of the front door 22. The operation table 5 projects forward from the front door 22, which is pivotally attached to the cabinet 2 via the hinge 30 provided on the left thereof.

The upper face of the operation table 5 is tilted so as to make a portion closer to a player 28 lower than that closer to the cabinet 2, allowing the player 28 to lean comfortably against the operation table 5 by placing their hands thereon. The 1-bet button 11, the 3-bet button 12, the 5-bet button 13 and the like, which are the input device for instructing the execution of a game, are provided on the operation table 5. On the right of the operation table 5, the spin button 14 is provided, which is used as a game start button to start a game under the condition that a bet has been made by the bet button 11, 12 or 13.

A cutout 21, whose periphery is a concave recessed toward the cabinet 2, is provided on the left side (a side closer to the hinge 30) of the front end portion of the operation table 5. A wrist rest 36 for supporting a wrist of the player 28 is provided on the right side of the operation table 5. The wrist rest 36 projects from the front end portion of the operation table 5 toward the player 28. The front end of the wrist rest 36 has a shape of a gentle arc swelling outwardly toward the player 28. Since the spin button 14, which is frequently used by the player 28 to start each game, is provided in a portion of the operation table 5 closer to the wrist rest 36, as shown in FIG. 6, the gaming machine 1 can alleviate fatigue experienced by the player 28, allowing her to play a game for a longer time.

In the present embodiment, since a description has been given of the gaming machine 1 designed for right-handed players, it has the wrist rest 36 on the right portion. However, a gaming machine 1 designed for left-handed players preferably has a wrist rest 36 on the left portion of an operation table 5. In this case, a cutout 21 is provided on the right portion of the operation table 5, and a front door 22 is pivotally attached to a cabinet 2 via a hinge 30 disposed on the right portion of the cabinet 2.

The lower panel 17 is provided below the operation table 5. The lower panel 17 is formed by laminating a film having a logo showing the name of the gaming machine and an image of characters and the like thereon, and a transparent acrylic plate. The lower panel 17 is disposed at a lower front face of the cabinet 2. A cold-cathode tube (not shown) is installed behind the lower panel 17, and light irradiated from the cold-cathode tube penetrates the lower panel 17 and lights up the logo and the image of characters and the like shown thereon. Accordingly, the image shown on the lower panel 17 becomes more visible to the audience watching the slot game from behind the player 28. In this way, the gaming machine 1 can differentiate itself from other types of gaming machines and increase its attractiveness.

Speakers and Exterior Frames

As shown in FIG. 2, speakers 20L and 20R for generating sound effects for the game are provided at the front face of the cabinet 2, between the main display 4 and the operation table 5.

The speakers 20L and 20R are configured to add effects for the game by generating sound relating to the game in response to a signal from a controller, and are controlled by the controller to generate sound independently from each other. Therefore, the right and left speakers 20R and 20L can produce sound with enhanced stereo effects, allowing the player to feel excited.

Exterior frames 19L and 19R are provided on both sides of the front door 22 on the front face of the cabinet 2, along a height direction. The exterior frames 19L and 19R have the same length as the length from the upper end of the front door 22 to the side portion of the operation table 5. The exterior frames 19L and 19R are attached to be integral with both lateral end portions of the front door 22, and at the same time installed at the side portions of the operation table 5.

Figure 5:
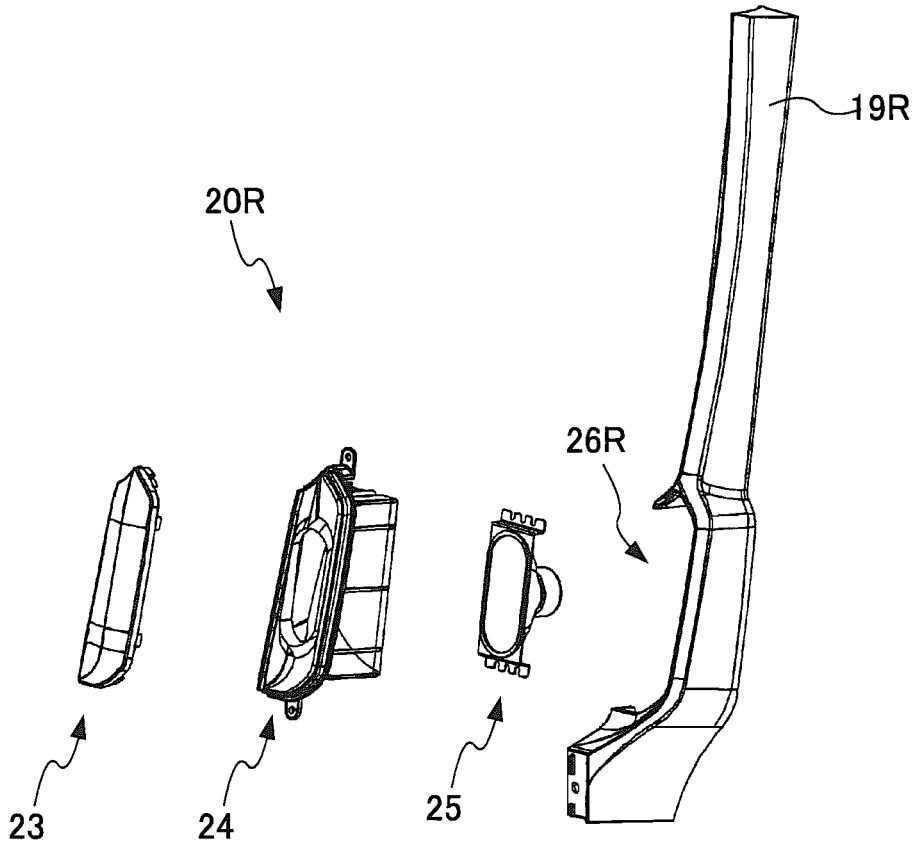
FIG. 5 is an enlarged exploded perspective view of a speaker.

As shown in FIG. 5, the exterior frame 19R installed on the right of the front door 22 has a C-shaped speaker space 26R. The position of the C-shaped speaker space is arranged to lie between the main display 4 and the operation table 5. The C-shaped speaker space bulges out in the width direction of the front door 22.

The speaker 20R includes: a speaker body 25 for outputting sound; a speaker box 24 for housing the speaker body 25; and a speaker grill 23 provided on the front face of the speaker box 24 for protection thereof. The front face of the speaker body 25 is fixed to the front wall of the speaker box 24, which is fixed inside the speaker space 26 provided in the exterior frame 19R. The size of the speaker space 26R provided in the exterior frame 19R is substantially the same as the size of the speaker 20R. The speaker 20R can thus be fixed inside the speaker space 26. Therefore, the speaker 20R can easily be attached to the front door 22 by way of the exterior frame 19R.

FIG. 5 is an exploded enlarged view of the speaker 20R disposed on the right of the cabinet 2. It should be noted that the speaker 20L disposed on the left of the cabinet 2 is similarly configured to have a mirrored image of FIG. 5.

Thus, it is possible to easily integrate the speakers 20L and 20R with the cabinet 2 by way of the exterior frames 19L and 19R, restricting the speakers 20L and 20R from projecting too much from the sides of the gaming machine 1. This allows a plurality of gaming machines 1 to be closely juxtaposed in a hall and the like. In this way, it is possible to save spacing between the adjacent gaming machines 1, thereby increasing the number of gaming machines 1 installed in a given installation area. In addition, since the speakers 20L and 20R can be protected by the exterior frames 19L and 19R, it is possible to protect the speakers 20L and 20R from possible damage during transportation of the gaming machine 1.

Furthermore, the exterior frames 19L and 19R, which are formed of sheet metal and a chrome plated ABS resin disposed thereon, have high stiffness. In case a foreign object hits the gaming machine 1 during transportation and the like, the exterior frames 19L and 19R protect the speakers 20L and 20R installed in the speaker spaces 26L and 26R from shock, thereby preventing damage to the speakers 20L and 20R. In addition, the exterior frames 19L and 19R with high stiffness prevent a malicious person who tries forcefully open the exterior frames 19L and 19R from damaging the gaming machine 1.

As shown in FIGS. 2 and 6, the exterior frames 19L and 19R extend from the upper end of the front door 22 to both sides of the operation table 5. The speaker spaces 26L and 26R provided in the exterior frames 19L and 19R are arranged so as to lie between the main display 4 and the operation table 5. In addition, the speaker spaces 26L and 26R arranged to lie at the front of the front door 22 and at the side portions of the operation table 5.

Since the speakers 20L and 20R are arranged to lie at the front face of the cabinet 2, they are allowed to be closer to the player 28 compared to when they are disposed on the side faces of the cabinet 2. In this way, the speakers 20L and 20R produce sound with presence that stimulates the player 28. Also, the close location of the speakers 20L and 20R relative to the player 28, which is implemented without causing the operation table 5 to project forward too much, contributes the production of sound with presence.

As shown in FIG. 6, the speakers 20L and 20R are arranged to be parallel to the main display 4 at the front of the cabinet 2. Front faces of the speakers 20L and 20R are tilted back so as to be oriented toward the ears of the player. This can orient the sound of the speakers to the player and improve sound effects.

When the front door 22 is opened for inspection and maintenance of the reels and wiring inside the cabinet 2, the speakers 20L and 20R, integrated with the front door 22 via the exterior frames 19L and 19R, move integrally with the front door 22.

In addition, if the speakers 20L and 20R are arranged to lie substantially at the height of the ears of the player 28, sound with more presence can be provided to the player, because the sound is produced at a position closer to the ears of the player.

Figure 4:
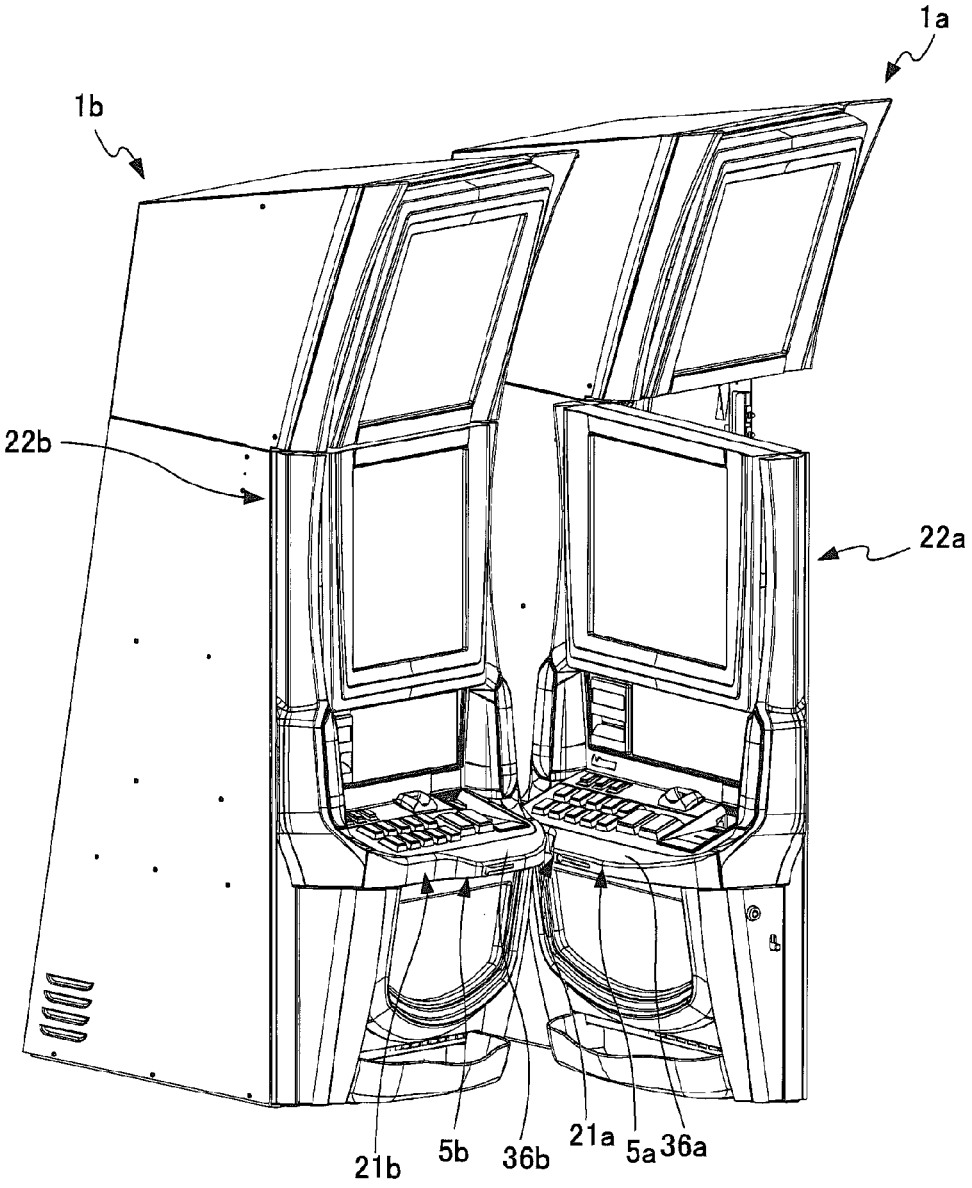
FIG. 4 is a perspective view illustrating gaming machines juxtaposed with a front door of one gaming machine in an open position.

A description is given of a case where first and second gaming machines 1a and 1b are juxtaposed with reference to FIGS. 1 and 4. The description is focused on a relation between a cutout 21a of the first gaming machine 1a and an operation table 5b of the second gaming machine 1b, while a front door 22a of the first gaming machine 1a is an open position.

FIG. 4 is a diagram illustrating the front door 22a in an open position of the first gaming machine 1a that is juxtaposed with the second gaming machine 1b. FIG. 1 is an enlarged view of the operation tables 5a and 5b of FIG. 4.

As shown in FIGS. 1 and 4, when inspection and maintenance of the first gaming machine 1a are carried out, the front door 22a can be opened, which pivots about a hinge provided on the left of the front door 22a.

In this case, the cutout 21a on the left of the operation table 5a of the first gamine machine 1a is likely to collide with the right end of a wrist rest 36b on the right of the operation table 5b of the second gaming machine 1b. Since a curved recess provided by the cutout 21a avoids interference with the wrist rest 36b, and the cutout 21a of the first gaming machine 1a is spaced a given distance from the wrist rest 36b of the adjacent second gaming machine 1b, the front door 22a of the first gaming machine 1a can be opened enough to perform easy maintenance inside the cabinet. Furthermore, since this can save spacing between the adjacent gaming machines 1a and 1b, it is possible to increase the number of gaming machines 1 that can be installed in a given area available for installation.

It should be noted that the present invention is not restricted to the above embodiments and various modifications and changes can be made.

What is claimed is:

1. A gaming machine, comprising:

a cabinet having a front opening;

a front door pivotably coupled to the cabinet via a hinge [that is] attached to a lateral [end portion at a front face of the cabinet, the front door opening and closing the front opening] *side of the cabinet and at a front side thereof*;

[a display device that is placed in the front face of the cabinet and displays information related to a game;] *and* an input device [for allowing a player to perform] *to input* an operation related to the [game; and a controller that performs processing related to execution of the game in response to an input to the input device, wherein] *gaming machine; wherein,* the front door [has] *includes* an operation table that [projects] *maintains a fixed position relative to the front door, and projects* forward [from the cabinet] *from the front door*,

[wherein the input device is placed on the operation table, wherein a side portion located at a front end of the operation table closer to the hinge is provided with a cutout portion such that a contour of the operation table is asymmetrically configured, wherein the cutout portion is formed at a front and toward a periphery of the operation table, which extends along the width direction of the front door, wherein the side portion of the operation table including the cutout portion has a smaller lateral width than the remaining portions of the operation table when viewed from the front of the gaming machine, wherein the operation table maintains a same position with respect to the front door regardless of whether the front door is opened or closed, and wherein in the operation table, which maintains a same position with respect to the front door, the cutout portion maintains a same position with respect to the front door when the front door is closed]

*the operation table extends along a width of the front door and includes an asymmetrically configured front edge perimeter to thereby form an operation table side having a recess and an operation table side having a protrusion, and*

*the operation table side having the recess is disposed toward the side of the front door including the hinge and the operation table side having the protrusion is disposed toward the side of the front door opposite the side of the front door including the hinge.*

2. The gaming machine according to claim 1, wherein the [cutout portion] *front edge perimeter corresponding to the operation table side having the recess* is concaved toward the [cabinet] *front door when compared with the front edge perimeter corresponding to the operation table side having the protrusion*.

3. The gaming machine according to claim 1, wherein [the cutout portion is formed at a front and toward a periphery of] the operation table [which] has *a longitudinal length that is* substantially the same *as the* width [as] *of* the front door.

4. The gaming machine according to claim 1, wherein the [cutout portion is formed so as to be concaved toward the cabinet, at a front and toward a periphery of the operation table which has substantially the same width as the front door] *operation table side having the recess has a depth extending from the front door that is less than a depth of the operation table side having the protrusion*.

5. The gaming machine according to claim 1, wherein the [cutout portion is formed at an end of the operation table distal to the front door] *operation table side corresponding to the recess has a longitudinal length that is less than a longitudinal length of the operation table side corresponding to the protrusion*.

6. A gaming machine, comprising:

a cabinet having a front opening;

a front door pivotably coupled to the cabinet via a hinge that is attached to a lateral [end portion at a front face of the cabinet, the front door opening and closing the front opening] *side of the cabinet and at a front side thereof*; *and,*

[a display device that is placed in the front face of the cabinet and displays information related to a game;

a bet button for allowing an arbitrary amount of bets;

a start button for allowing a game to start in response to betting through the bet button;]

an input device [that has] *including* at least [the] *one of a* bet button *to input a bet* and [the] *a* start button *to input a game start command*;

[a controller that performs processing related to execution of the game in response to an input to the input device,]

[wherein] *wherein,* the front door [has] *includes* an operation table that [projects] *maintains a fixed position relative to the front door, and projects* forward from the [cabinet] *front door*,

[wherein the input device is placed on the operation table, wherein] *the operation table extends along a width of the front door and includes an asymmetrically configured front edge perimeter to thereby form an operation table having* a first *recessed* side portion [located at a front end of the operation table] *disposed* closer to the hinge [is provided with a cutout such that a contour of the operation table is asymmetrically configured, wherein the cutout is formed at a front and toward a periphery of the operation table, which extends along the width direction of the front door,] *and a second protruding side portion disposed away from the hinge; and*, wherein the first *recessed* side portion [provided with the cutout] *of the operation table* has a smaller [width of the operation table than the other portions of the operation table] *depth, which extends from the front door and to the front edge perimeter, than the second protruding side portion* when viewed from the front of the gaming machine[, wherein a rest portion is provided at a second side portion opposite to the first side portion, wherein the start button is arranged so as to be on a closer side with respect to the rest portion on the operation table, wherein the operation table maintains a same position with respect to the front door regardless of whether the front door is opened or closed, and wherein in the operation table, which maintains a same position with respect to the front door, the cutout portion maintains a same position with respect to the front door when the front door is closed].

7. The gaming machine according to claim 6, wherein the [cutout portion is formed at a front and toward a periphery of the] operation table [which] has *a longitudinal length that is* substantially the same *as the* width [as] *of* the front door.

8. The gaming machine according to claim 6, wherein the [cutout portion is formed so as to be] *front edge perimeter corresponding to the first recessed side portion is* concaved toward the cabinet[, at a front and toward a periphery of] *and* the operation table [which] has *a longitudinal length that is* substantially the same *as the* width [as] *of* the front door.

9. The gaming machine according to claim 6, wherein the [cutout portion is formed at an end of the operation table distal to the front door] *operation table side corresponding to the first recessed side portion has a longitudinal length that is less than a longitudinal length of the operation table side corresponding to the second protruding side portion.*

10. A gaming machine, comprising:

a cabinet having a front opening;

a front door pivotably coupled to the cabinet via a hinge that is attached to a lateral [end portion at a front face of the cabinet, the front door opening and closing the front opening] *side of the cabinet and at a front side thereof*;

a display device that is placed in the front face of the cabinet and displays information related to a game; *and,* an input device [for allowing a player to perform] *to input* an operation related to the [game] *gaming machine*; [and a controller that performs processing related to execution of the game in response to an input to the input device,]

wherein the front door has an operation table that *maintains a fixed position relative to the front door and* projects forward from the [cabinet] *front door*,

[wherein the input device is placed on the operation table,]

wherein the operation table [including an asymmetrically contoured front face comprises a cutout portion and a protruding portion] *extends along a width of the front door and includes an asymmetrically configured front edge perimeter to thereby form an operation table side having a recess and an operation table side having a protrusion*,

[wherein the cutout portion is formed at a front and toward a periphery of the operation table, which extends along the width direction of the front door, wherein] the [cutout portion] *operation table side having the recess* is disposed proximate a lateral side of the cabinet including the hinge,

[wherein] the [protruding portion] *operation table side having the protrusion* is disposed distal [a] *the* lateral side of the cabinet including the hinge,

[wherein] the [cutout portion] *operation table side having the recess* is disposed toward the [cabinet] *front door* relative to the [protruding portion] *operation table side having the protrusion*, *and*

[wherein the cutout portion allows the front door to be opened so as to minimize] *when the front door is opened,* interference of the operation table with a structure adjacent the cabinet and proximate the hinge[,] *is reduced*

[wherein the operation table maintains a same position with respect to the front door regardless of whether the front door is opened or closed, and wherein in the operation table, which maintains a same position with respect to the front door, the cutout portion maintains a same position with respect to the front door when the front door is closed].

11. The gaming machine according to claim 10, wherein [the cutout portion is formed at a front and toward a periphery of] the operation table [which] has *a longitudinal length that is* substantially the same *as the* width [as] *of* the front door.

12. The gaming machine according to claim 10, wherein the [cutout portion is formed so as to be] *operation table side having the recess is* concaved toward the cabinet[, at a front and toward a periphery of] *and* the operation table [which] has *a longitudinal length that is* substantially the same *as the* width [as] *of* the front door.

13. The gaming machine according to claim 10, wherein the [cutout portion is formed at an end of the operation table distal to the front door] *operation table side having the recess has a depth extending from the front door that is less than a depth of the operation table side having the protrusion.*

*14. The gaming machine according to claim 10, wherein the operation table side having the recess has a longitudinal length that is less than a longitudinal length of the operation table side having the protrusion.*

*15. The gaming machine according to claim 1, wherein the input device is disposed on the operation table.*

*16. The gaming machine according to claim 6, wherein the input device is disposed on the operation table.*

*17. The gaming machine according to claim 10, wherein the input device is disposed on the operation table.*

*18. A gaming machine, comprising:*

*a cabinet having a front opening;*

*a front door pivotably coupled to the cabinet via a hinge attached to a lateral side of the cabinet and at a front side thereof;*

*an operation table projecting frontward from the front door; and*

*an input device configured to input an operation related to the gaming machine; wherein,*

*the operation table maintains a fixed position relative to the front door and extends along a width of the front door,*

*the operation table includes an asymmetrically configured front edge perimeter that serves to define an operation table depth that extends forward from the front door and to the front edge perimeter of the operation table, the operation table depth varying as the operation table extends along the width of the front door; and wherein,*

*the operation table depth on a side of the operation table closer to the hinge is less than the operation table depth on that side of the operation table that is opposite the hinge.*

*19. The gaming machine according to claim 18, wherein the front edge perimeter corresponding to the operation table side closer to the hinge is concaved toward the front door when compared with the front edge perimeter corresponding to the operation table side opposite the hinge.*

*20. The gaming machine according to claim 18, wherein the operation table has substantially a same longitudinal length as the width of the front door.*

*21. The gaming machine according to claim 18, wherein the input device is disposed on the operation table.*

* * * * *